United States Patent [19]

Nakanishi

[11] Patent Number: 5,570,492

[45] Date of Patent: Nov. 5, 1996

[54] JOINT FOR EYEGLASS TEMPLES

[75] Inventor: Eiichi Nakanishi, Hyogo, Japan

[73] Assignee: Nakanishi Optical Corporation, Osaka, Japan

[21] Appl. No.: 405,197

[22] Filed: Mar. 16, 1995

[51] Int. Cl.[6] .................................................. G02C 5/22
[52] U.S. Cl. ............................................. 16/228; 351/111
[58] Field of Search ...................... 16/228, 224; 351/111, 351/112, 121, 115, 119, 140, 153

[56]  References Cited

U.S. PATENT DOCUMENTS

| 232,795 | 9/1880 | Willson et al. | 351/115 |
| 610,875 | 9/1898 | Hirst | 351/115 |
| 1,899,402 | 2/1933 | Verre | 351/115 |
| 2,192,208 | 3/1940 | Stevens | 351/121 |

FOREIGN PATENT DOCUMENTS 3404511  8/1980  Germany ................................. 16/228

*Primary Examiner*—Chuck Y. Mah
*Attorney, Agent, or Firm*—Antonelli, Terry, Stout & Kraus

[57]  ABSTRACT

A pivotal member 6 is fixed an end-piece 8 secured to an outer edge of each lens rim 2, and has an annular groove 7 formed integral with and around the outer periphery of pivotal member. An end of the end-piece 8 extends upwards along the pivotal member 6 so as to provide a stopper 9 for a temple 5. A front end of the temple is curved to form a C-shaped arcuate member 10 which rotatably engages with the annular groove 7 in the pivotal member 6. The stopper 9 on the retainer abuts against and stops the arcuate member when it has rotated a predetermined angular distance, such that a joint for attaching eyeglass temples does not need any minute hinge bolts and can be of any shape to improve its ornamental value.

4 Claims, 4 Drawing Sheets

5,570,492

JOINT FOR EYEGLASS TEMPLES

BACKGROUND OF THE INVENTION

The present invention relates to a joint for attaching eyeglass temples.

One of the most popular joints currently employed for eyeglass temples is a hinge which comprises a pair of butterfly wings, wherein one of the wings is attached to an end-piece secured to an outer edge of lens rim, with the other wing attached to the temple. The butterfly wings are connected one to another by a minute bolt so as to be rotatable relative to each other.

The minute bolt however tends to loosen and often becomes rickety during use of the eyeglasses. The wings of eyeglass hinge cannot be shaped freely, thus imparting a certain limitation to an ornamental variation thereof.

SUMMARY OF THE INVENTION

The present invention was made to resolve such problems, and its object is to provide for eyeglass temples a joint which comprises no bolt and but affords an improved ornamental design.

In order to achieve this object, the joint proposed herein to hold each temple does comprise a pivotal member which is fixed to an end-piece secured to an outer edge of lens rim or fixed to a front end of the temple, with the pivotal member connected to an arcuate member which in turn is fixed to the front end or the outer edge, correspondingly. The pivotal member has an annular groove or lug which slidably engages with an annular lug or groove formed in the arcuate member such that the arcuate member is rotatable around and relative to the pivotal member. The joint further comprises a stopper which is fixed either to the end-piece or to the temple so as to limit the rotation angle of the arcuate member.

The joint of such a structure enables arcuate member to rotate around the outer periphery of the pivotal member so that the temple can be opened and closed. The design of the pivotal member can be varied in appearance.

THE PREFERRED EMBODIMENTS

Several embodiments of the present invention will now be described referring to the accompanying drawings.

Figure 1:
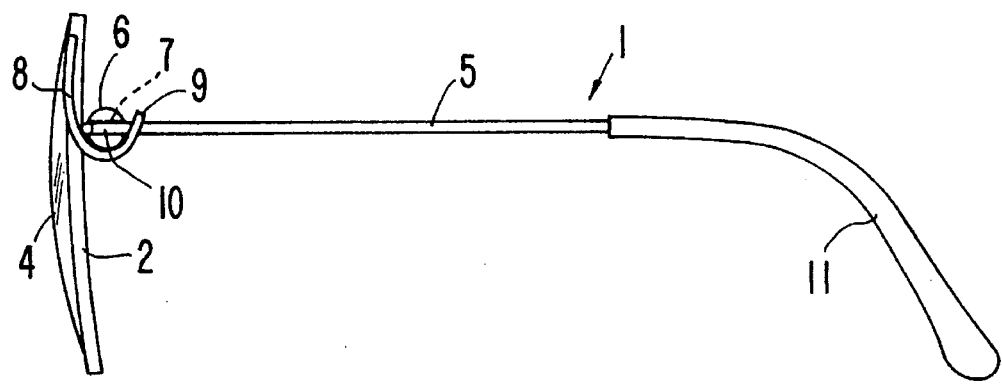
FIG. 1 is a side elevation of which have joints provided in an embodiment of the present invention so as to secure eyeglass temples.
Figure 2:
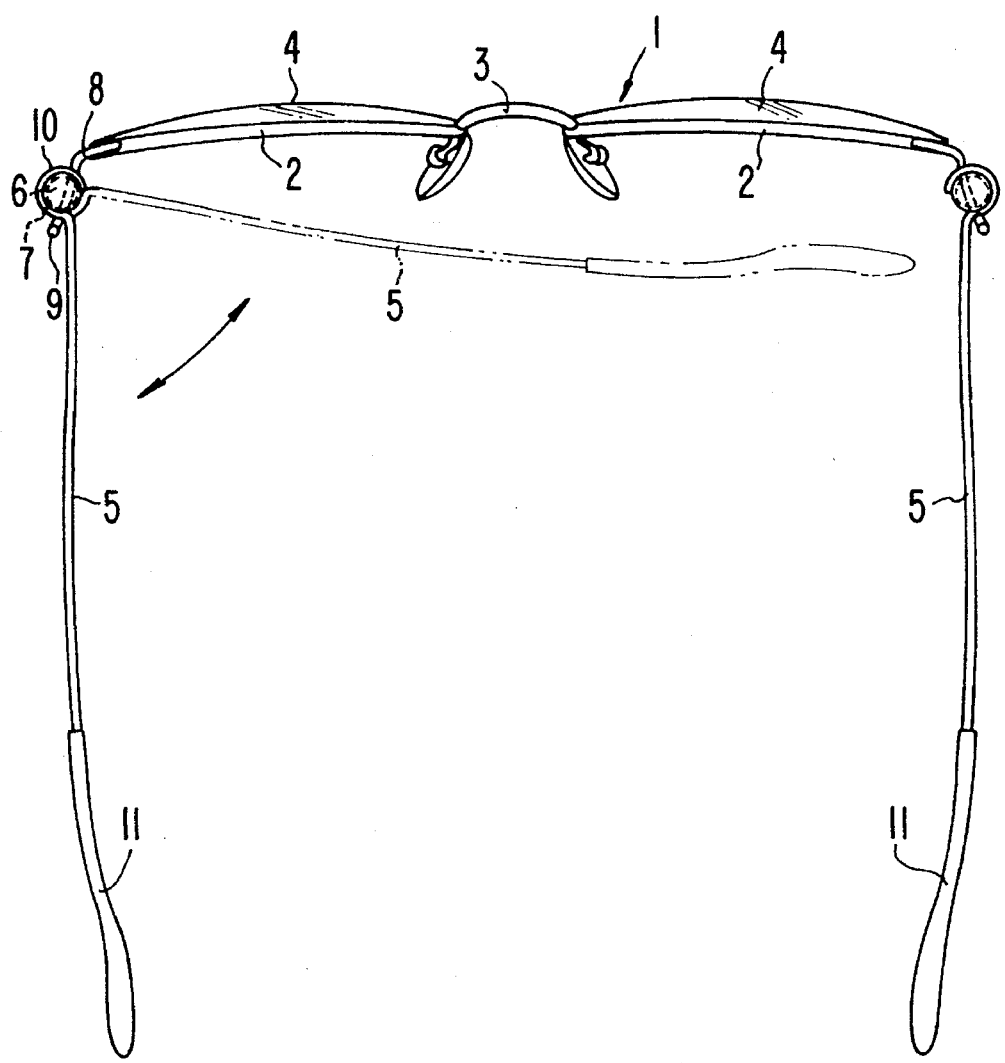
FIG. 2 is a top plan view of the eyeglasses.
Figure 3:
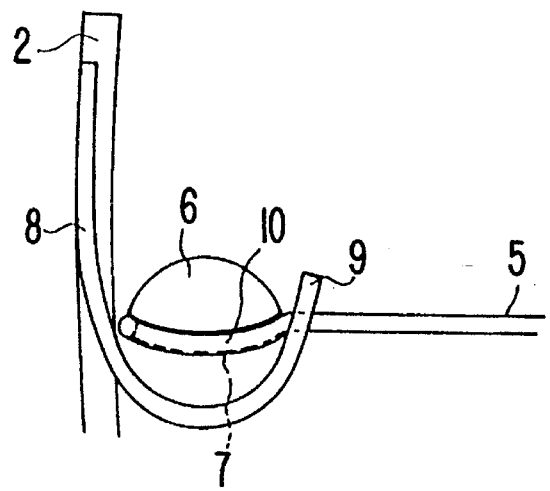
FIG. 3 is an enlarged side elevation showing a principal part of the eyeglasses.
Figure 4:
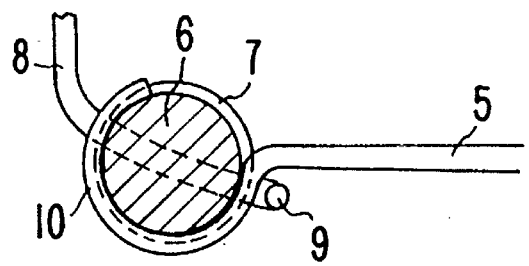
FIG. 4 is an enlarged plan view showing partly in cross section the principal part.

FIGS. 1 and 2 show eyeglasses 1 which comprise joints to attach temples to their shoulder portions. A pair of right and left-hand lens rims 2 each fitting on a lens 4 are connected by a bridge 3 one to another. Each temple 5 is rotatably secured to the outer edge of the rim 2 in a manner different from the prior art hinged structure.

A pivotal member 6, spherical in this embodiment, is held in place at an outer edge of the lens rim 2. An annular groove 7 is formed around and in the outer periphery of the pivotal member 6. In detail, the outer edge of lens rim 2 is adjoined to an end of a small length of wire, i.e., an end-piece 8. Another end of the end-piece 8 is adjoined to the pivotal member 6 and extends upwards beyond it so as to function as a stopper 9 for the temple, as detailed below. On the other hand, the temple 5 is also made of a length of thin wire, and a curved front end of this wire is C-shaped so as to provide an arcuate member 10. This arcuate member 10 (serving as an integral annular lug) rotatably engages with the annular groove 7 of the pivotal member 6. Thus, each of the temples 5 can rotate around this member 6 to take its closed position shown by phantom lines in FIG. 2. When the eyeglasses are used, each temple 5 can be rotated towards its open position until stopped by the stopper 9 of the end-piece 8, as illustrated with solid lines in FIGS. 1 and 2. The reference numeral 11 denotes bows which are made of a Celluloid (a registered trademark) or the like so as to rest on ears of a user.

Figure 5:
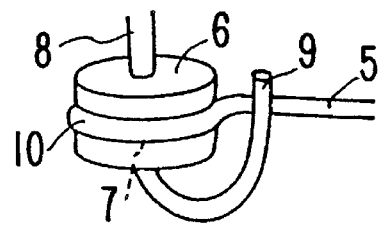
FIG. 5 is a perspective view of the principal part in another embodiment.

FIG. 5 shows another embodiment, wherein a pivotal member 6 is a short columnar piece or disc. An end-piece 8 in this case penetrates a center of the pivotal member 6 and is secured thereto. The shapes of and connection between the pivotal member 6 and end-piece 8 are modified so that a variety of designs are available to the temples 5 and their connected portions.

Figure 6:
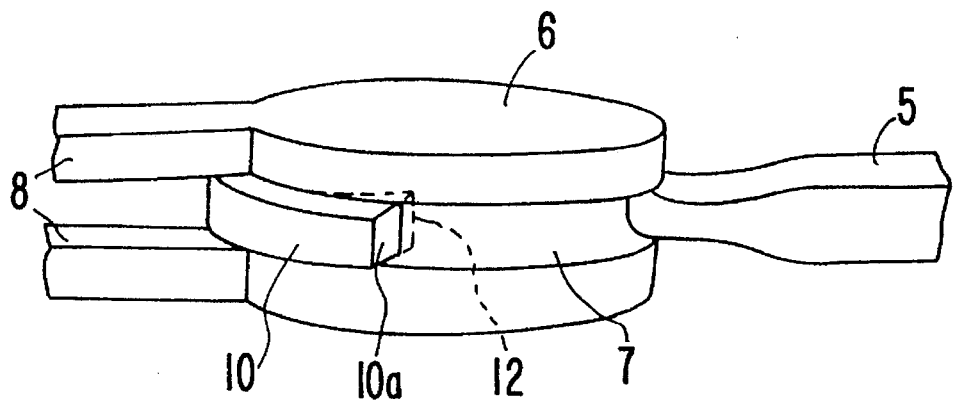
FIG. 6 is a perspective view of a joint provided in accordance with a further embodiment.
Figure 7:
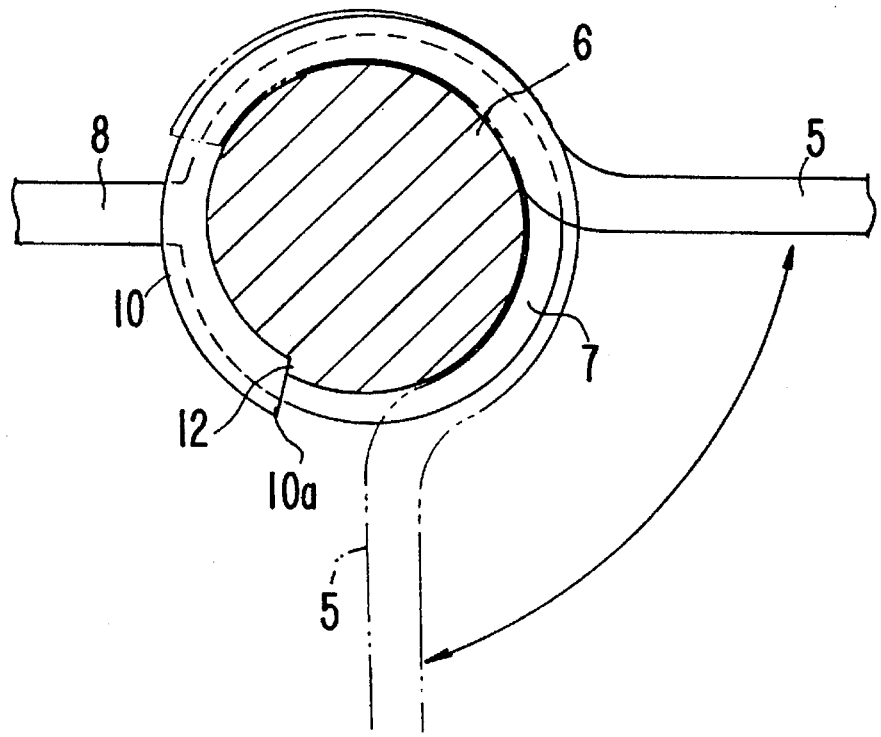
FIG. 7 is a horizontal cross section of a principal part of the joint in the further embodiment.

FIGS. 6 and 7 show a further embodiment, in which a stepped recess 12 is formed in bottom of an annular groove 7 also extending around the pivotal member 6. A frontal end 10a of the arcuate member 10 will click in the recess 12 serving as a stopper, when the temple 5 is rotated to its open position. Such a stopping mechanism simplifies the eyeglasses in their structure and renders them smart and slim in appearance. Retainers 8 to adjoin each pivotal member 6 to the rim 2 in this case are made integral with said member 6.

Figure 8:
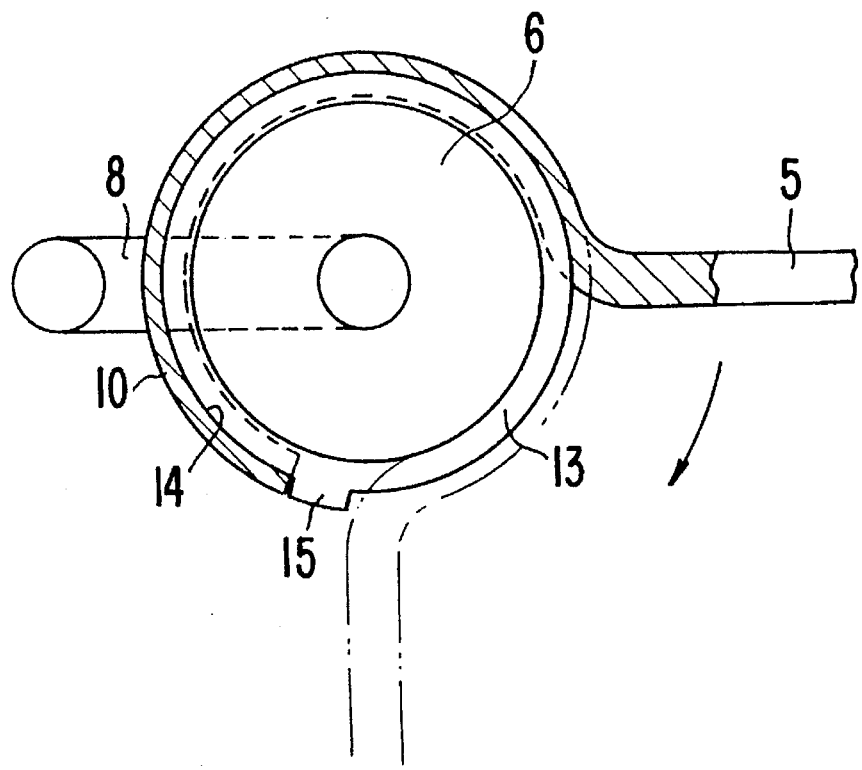
FIG. 8 is a plan view of a joint which is provided in a still further embodiment and has a principal part shown partly in horizontal cross section.
Figure 9:
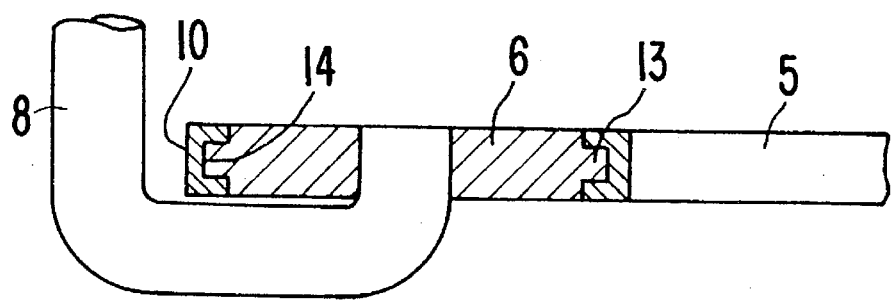
FIG. 9 is a vertical cross section of the principal part of the joint in the still further embodiment.

FIGS. 8 and 9 show a still further embodiment, wherein an annular lug 13 is formed integral with and around the pivotal member 6. Correspondingly, a circumferential groove 14 is formed along the inner periphery of the arcuate member 10. Also, this member 10 is integral with the front end of temple 5, and the groove 14 rotatably fits on the annular lug 13. A radial protrusion 15 extends outwards from the annular lug so as to serve as a stopper delimiting the rotation of the temple 5.

In the described embodiments, the pivotal member 6 is attached to the rim 3, with the arcuate member 10 being formed as a front part of the temple 5. Alternatively, the pivotal member 6 may be formed on the side of the temple 5 and the arcuate member 10 may extend from the lens rim 3. Further, an annular arcuate member may substitute for the C-shaped one 10 in the embodiments.

It will now be apparent that the joint provided herein to secure eyeglass temples is composed of a smaller number of parts and simpler in structure, so that the eyeglass units can be manufactured more easily and at a lower cost, as compared with the prior art hinged structure of the temples.

In addition, the pivotal member as well as the arcuate member can be designed freely and in varied manners so as to improve the ornamental value of the eyeglasses.

What is claimed is:

1. A joint for securing eyeglass temples, the joint comprising:

a pivotal member fixed to an end-piece which is secured at one of its ends to an outer edge of a lens rim;

a temple having a front end engaging the pivotal member for rotational movement about said pivotal member;

an annular groove formed integral within and around the pivotal member;

said front end of the temple comprising an arcuate member rotatably engaging with the annular groove of the pivotal member; and said end-piece comprising a stopper arranged to delimit the rotational movement of said temple.

2. A joint as defined in claim 1, wherein said stopper is arranged at the other end of said end-piece.

3. A joint as defined in claim 1, wherein said temple comprises a thin metal wire and said arcuate member comprises a length of the thin metal wire bent into a C-shape.

4. A joint as defined in claim 3, wherein said arcuate member is integrally connected to a linear portion of the temple by a portion bent in a direction transverse to the linear portion, said bent portion mating with the stopper to delimit the rotational movement of the temple.

* * * * *